United States Patent [19]

Lysikov et al.

[11] 4,075,036
[45] Feb. 21, 1978

[54] PROFILED MULTIELECTRODE THERMOCOUPLE

[76] Inventors: Boris Vasilievich Lysikov, Universitetsky prospekt, 21, korpus 1, kv. 8; Jury Nikolaevich Shabanov, Sakhalinskaya ulitsa, 6, korpus 1, kv. 217; Jury Viktorovich Rybakov, ulitsa Gancharova, 7, kv. 58, all of Moscow; Valentina Ivanovna Svetlova, stantsia Malakhovka, ulitsa Turgeneva, 43, Maskovskaya oblast, all of U.S.S.R.

[21] Appl. No.: 611,845

[22] Filed: Sept. 10, 1975

[30] Foreign Application Priority Data

Sept. 10, 1974 U.S.S.R. .................................. 2058145

[51] Int. Cl.² .......................... H01V 1/00; G01K 7/04
[52] U.S. Cl. ................................... 136/225; 136/212; 136/230; 136/233; 73/359
[58] Field of Search ........ 136/212, 225, 227, 230–233; 73/341, 359

[56] References Cited

U.S. PATENT DOCUMENTS

| 2,994,219 | 8/1961 | Schaschl | 136/225 |
| 3,393,101 | 7/1968 | Kirkpatrich | 136/231 |
| 3,512,413 | 5/1970 | Krusestierna et al. | 73/341 |
| 3,834,237 | 9/1974 | Robertson | 136/230 |

FOREIGN PATENT DOCUMENTS 970,241  9/1964  United Kingdom ................. 136/227

*Primary Examiner*—Nelson Moskowitz
*Attorney, Agent, or Firm*—Lackenbach, Lilling & Siegel

[57] ABSTRACT

The proposed profiled multielectrode thermocouple comprises a flexible protective shell wherein there are arranged a thermoelectrode of one polarity, constructed as a bundle of thermoelectrodes of one polarity and of different lengths, and at least two thermoelectrodes of the opposite polarity with working junctions spaced at a preset distance along the thermocouple. The thermocouple of the present invention is basically intended for simultaneously measuring temperature at several points of an industrial installation.

10 Claims, 5 Drawing Figures

PROFILED MULTIELECTRODE THERMOCOUPLE

The present invention relates to instruments for measuring temperature in industrial installations and, more specifically, to profiled multielectrode thermocouples for simultaneously measuring temperature at several points in an installation. Thermocouples are used, in the main, for continuously or periodically measuring temperature in operating installations.

Requirements imposed today upon temperature measurements, especially in powerful nuclear power plants, necessiate the availability of data on temperature distribution throughout and outside of the core with the use of a minimum possible number of sensors. It is imperative that such sensors should be of a minimum diameter and great length so as to avoid introduction of additional amounts of metal into the core and make it possible to dispose sensors in small-diameter channels. In other words, temperature measurements have to be taken at a great number of points, at hard-to-get-at places, and under the conditions of high neutron fluxes, aggressive media, and vibration.

There is known a device for measuring temperature (cf. UK Patent Specification No. 874,650, Cl. 40(1) of 1956) at a number of points inside a tower silo. This device comprises a central conductor to which there is soldered a number of spaced secondary conductors which make up thermocouples. This may be, for example, a long insulated constant conductor and insulated copper conductors soldered equidistantly thereto to provide hot junctions. Each conductor has a specific color code (is of a specific color) and is placed in a transparent envelope. The device is of an indefinite length, so that it is possible to cut portions of a desired length therefrom. Normally, such bundles of thermocouples with steel conductors have a common envelope, thus making up a cable. The device under review is employed, in the main, for measuring comparatively low temperatures, hence, such thermocouples cannot be used for measuring temperature in nuclear reactors, moreover, because they have large cross-sections and are made of great amounts of metal. Low radiation resistance of thermocouple alloys is another reason.

There is further known a four-electrode thermocouple with two working junctions placed at the same level (cf. V. F. Suchkov, "Zharostoykiye kabeli s magnesitovoy izolyatsiyey" /"Heat-Resistant Gables with Magnesite Insulation"/, Energhia Publishers, 1969).

This type of thermocouple makes it possible to simultaneously measure temperature at two points at the same level. It does not make it possible, however, to measure temperature at different levels. A great number of conductors and, consequently a great mass of metal in such thermocouples, which metal is introduced into a reactor's core, adversely affect the results of measurements.

There is also known a multipoint thermocouple designed as a set of thermocouples in a metal shell (cf., for example, thermocouples manufactured by Japan Thermowelle Co., Ltd.). The thermocouple under review is composed of two or more cable-type thermocouples inserted into a common protective tube. There must be an individual cable thermocouple for each measurement zone. The metalshell accounts for a substantial portion of the total amount of metal in this type of thermocouple. This leads to an increased thermal inertia of the sensor. Besides, while measuring temperature in a nuclear reactor's core, this distorts the neutron field and enhances the neutron capture.

There is known a profiled multielectrode thermocouple comprising a protective shell, wherein, being insulated from each other, there are a thermoelectrode of one polarity and at least two thermoelectrodes of the opposite polarity with working junctions spaced at a predetermined distance one from the other along the thermocouple, the first working junction of the two thermoelectrodes of opposite polarities being located at the end of the thermocouple opposite to its cold end (cf. U.S. Pat. No. 3,716,417, Cl. 136-232).

The thermoconductors in such a thermocouple are placed in a hard insulation rod of aluminum oxide which is enveloped by protective quartz coating.

The latter design is advantageous in that the number of conductors over the cross-section of the thermocouple is not constant throughout its length, but decreases with each hot junction, there remaining only two conductors at the thermocouple's end, which extend outside the insulation rod. That notwithstanding, the great hardness and brittleness of the insulation materials make it extremely difficult to work them in order to produce working junctions. In addition, a thermocouple of this type has a relatively large diameter and small length which is insufficient to enable one sensor to measure temperature at a required number of points. In addition, thermocouples of this type do not possess sifficient vibration strength and flexibility.

It is an object of the present invention to provide a profiled multielectrode thremocouple of a compact design.

It is another object of the present invention to make this thermocouple flexible.

It is still another object of the present invention to provide a thermocouple which would ensure a stable measurement accuracy while taking measurements in aggressive media.

It is yet another object of the present invention to provide a radiation- and vibration-resistant thermocouple.

It is also an object of the invention to ensure production effectiveness of the proposed type of thermocouple.

The foregoing and other objects of the present invention are attained by providing a profiled multielectrode thermocouple comprising a protective shell wherein there are disposed and insulated from one another one thermoelectrode of one polarity and at least two thermoelectrodes of the opposite polarity with working junctions spaced at a preset distance from one another along the thermocouple, the first working junction of the two thermoelectrodes of opposite polarities being at the end of the thermocouple opposite its cold end, in which thermocouple the thermoelectrode of one polarity is made, in accordance with the invention, as a bundle of thermoelectrodes of different lengths, their number corresponding to that of the thermoelectrodes of the opposite polarity, the common point of said bundle of thermoelectrodes being the working junction, the ends of said thermoelectrodes being undetachably connected to the thermoelectrodes of the opposite polarity, the ratio between the diameter and length of the protective shell being at least 1:50.

The proposed multielectrode thermocouple is compact, has a small number of electrodes, and one shell. When used for measuring temperature in a reactor's core, it accounts for a lesser amount of metal introduced into said core, as compared to conventional thermocouples.

The diameter of the proposed multielectrode thermocouple may vary, depending upon the number of working junctions, between 1.0 and 6.0 mm, whereas its length may be from a few tens of millimeters to over 50 m.

The proposed thermocouple may be installed in narrow ducts or slots and small-diameter channels. Owing to its flexibility, it may follow all the bends of a channel, which makes it possible to measure temperature at places that are the hardest to get at. The thermocouple of the present invention may be used for simultaneously measuring temperature in several zones of a reactor, for example, in five regions including the moderator, coolant zone, fuel element circuit, metal structures, and biological shielding.

Due to its great length, the proposed thermocouple may be constructed, if necessary, without any compensation wires. It may be directly connected, without any intermediary leads, to a measuring device, which substantially raises its reliability, in particular, when operating in highly aggressive media.

The thermocouple of the present invention is easy to manufacture; hence, its low production costs.

Other objects and advantages of the present invention will become more apparent from the following detailed description of a preferred embodiment thereof taken in conjunction with the accompanying drawings, wherein.

Figure 1:
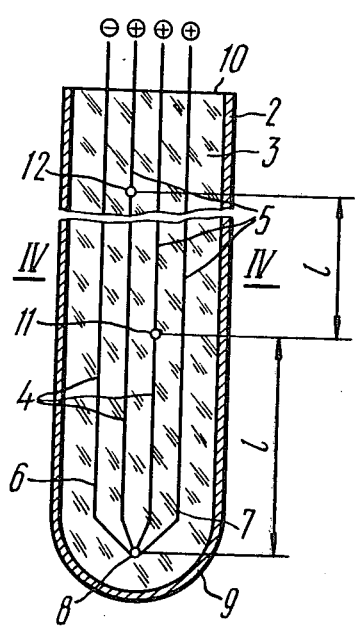
FIG. 1 is an elevation view of a profiled multielectrode thermocouple in accordance with the invention.

Referring now to the attached drawings, a profiled multielectrode thermocouple 1 (FIG. 1) comprises a flexible protective shell 2 having a free or probe end 9 wherein there are disposed a bundle 4 of thermoelectrodes of negative polarity, having an equal diameter but different lengths. The thermoelectrodes in the bundle 4 are insulated from one another by powdered ceramic insulation. Said electrodes are manufactured, for example, from alumel alloy.

In the embodiment under review, the shell 2 also houses three thermoelectrodes 5 of positive polarity made, for example, from Chromel alloy.

Two thermoelectrodes 6 and 7 of opposite polarities have a first working junction 8 at a remote point proximate to the probe end 9 of the thermocouple 1 opposite its cold end 10. The first working junction 8 is the common point of the bundle 4 of thermoelectrodes which emanate from the common point 4 and diverge therefrom as shown at an angle less than 180° relative to each other. Working junctions 11 and 12 of the thermoelectrodes 5 and those of the bundle 4 are disposed at intermediate points spaced at a distance 1 along the length of the thermocouple 1.

The diameter-to-length ratio of the shell 2 is 1:50, which accounts for great flexibility of the thermocouple 1 so that it can follow any bend of a channel 13 (FIG. 2) of an installation being checked, wherein said thermocouple 1 is installed.

The number of the thermoelectrodes 5 in the shell 2 is selected depending upon a required number of points at which temperature measurements are to be taken.

Figure 3:
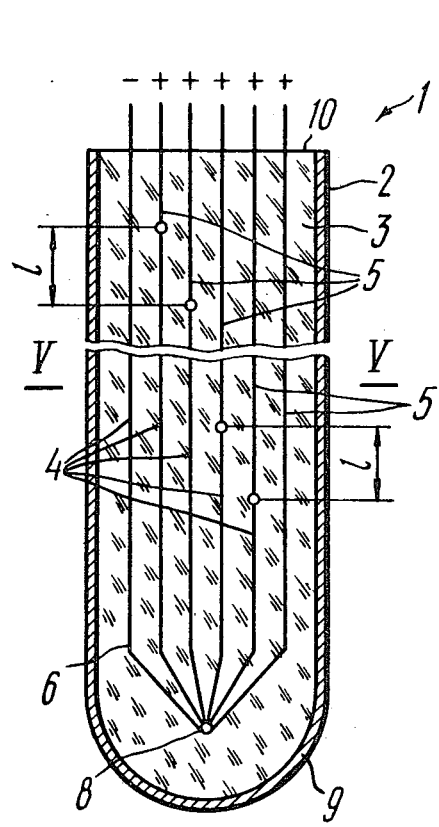
FIG. 3 is an elevation view of an alternative embodiment of the multielectrode thermocouple of the present invention, having six electrodes.

According to one preferred embodiment, there are six thermoelectrodes 5 (FIG. 3).

Figure 4:
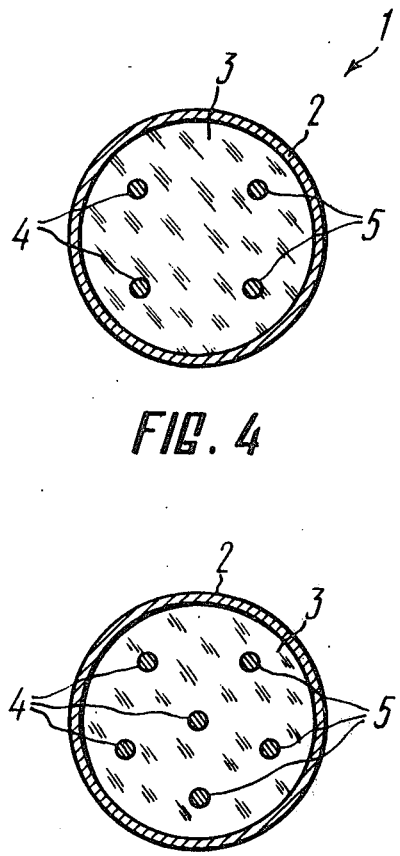
FIG. 4 is a sectional view taken along the line IV—IV of FIG. 1.
Figure 5:
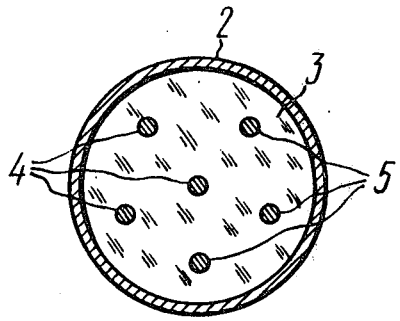
FIG. 5 is a sectional view taken along the line V—V of FIG. 3.

The thermoelectrodes 4 and 5 are arranged symmetrically over the cross-section of the thermocouple 1 (FIGS. 4 and 5).

The thermocouple of the present invention operates as follows.

As the thermocouple 1 is inserted into the channel 13 (FIG. 2) to reach a predetermined depth, from the thermocouple's leads there are measured values of the thermoelectromotive force corresponding to the temperatures at the three levels whose number is equal to that of the working junctions.

Thus, the proposed thermocouple 1 (FIG. 1) consists, in fact, of several thermocouples. The first thermocouple is composed of the negative thermoelectrode 6 and the positive thermoelectrode 7 which together form the working junction 8. This thermocouple gives the value of the thermoelectromotive force corresponding to the temperature in the location of the junction 8. The second thermocouple is composed of the two portions 6 and 4 of the thermoelectrodes of negative polarity and the positive thermoelectrode 5 which are undetachably connected at a butt joint as shown. This thermocouple gives the value of the thermoelectromotive force corresponding to the temperature in the location of the junction 12. The third thermocouple is composed of the two portions 6 and 4 of the thermoelectrodes of negative polarity and the positive thermoelectrode 5 which are undetachably connected at a butt joint as shown. This thermocouple gives the value of the thermoelectromotive force corresponding to the temperature in the location of the junction 11. The junctions 8, 11 and 12 are spaced at a preset distance 1.

Figure 2:
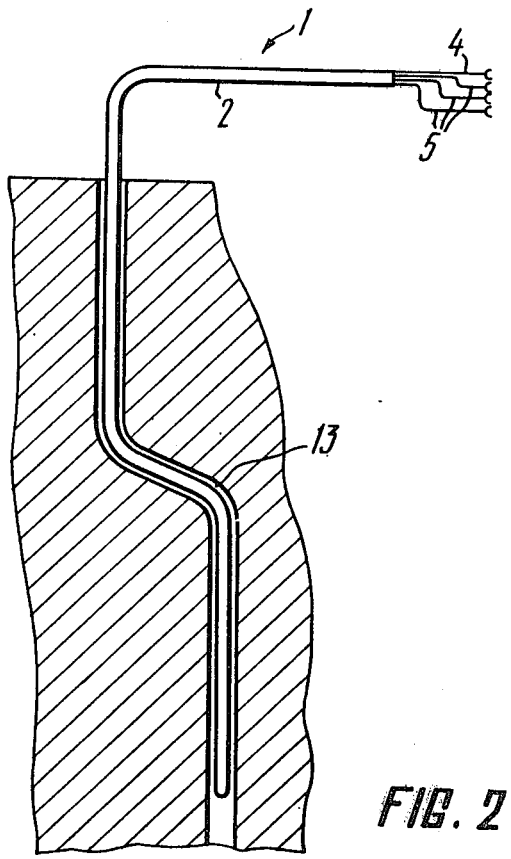
FIG. 2 shows a thermocouple of the present invention installed in a channel of an industrial installation.

The thermocouple of the present invention is compact, has a small number of electrodes and only one shell and is in the nature of a long flexible cable as shown in FIG. 2. When in-troduced into a reactor's core, it accounts for a smaller amount of metal introduced into the core, as compared to conventional thermocouples. In addition, the proposed thermocouple has a small diameter and a length of more than 50 m, which makes it possible to insert it into narrow channels of any profile, as well as to connect it to a measuring instrument without using compensation wires.

What is claimed is:

1. A profiled multielectrode thermocouple comprising a flexible protective shell having a free or probe end; first thermoelectrode means of one polarity constructed as a bundle of thermoelectrodes of different lengths and insulated from one another, the longest thermoelectrode of said one polarity extending through said shell to a remote point proximate to said probe end, and the other thermoelectrodes of said one polarity having shorter lengths and connected to said longest thermoelectrode at said remote point and extending from said remote point to different intermediate points along the length of said shell; and second thermoelectrode means comprising at least two thermoelectrodes of different lengths and of opposite polarity arranged in said shell each of which is connected to another one of said thermoelectrodes of said one polarity, said longest thermoelectrode of said one polarity being connected to the longest thermoelectrode of said other polarity at said remote point to form a first working junction, each connection of an associated pair of thermoelectrodes of opposite polarities at an intermediate point forming an intermediate working junction, said working junctions at said remote and intermediate points being spaced from each other at substantially uniform distances along the length of said protective shell.

2. A thermocouple as defined in claim 1, wherein said shell has a circular cross-sectional area, and has a diameter to length ratio of at least 1:50 to thereby impart great flexibility thereto.

3. A thermocouple as defined in claim 1, wherein said shell has a circular cross-sectional area, and has a diameter in the range of between 1.0 and 6.0 mm.

4. A thermocouple as defined in claim 1, wherein the length of said shell is in the range of between 0.2 and 50 m.

5. A thermocouple as defined in claim 1, wherein said working junctions are spaced from each other a preselected or predetermined uniform distance.

6. A thermocouple as defined in claim 1, wherein said shell has an axis of symmetry, and wherein said thermoelectrodes are symmetrically arranged about said axis of symmetry.

7. A thermocouple as defined in claim 6, wherein four thermocouples extend through a cross-section of said shell and are arranged at points corresponding to the corners of a square.

8. A thermocouple as defined in claim 6, wherein six thermoelectrodes extend through a cross-section of said shell and five of said thermoelectrodes are arranged on the vertices of a pentagon and the sixth thermoelectrode is arranged in the center of said pentagon substantially coaxial with said axis of symmetry.

9. A profiled multielectrode thermocouple comprising a protective shell; a thermoelectrode of one polarity arranged in said shell and constructed as a bundle of thermoelectrodes of different lengths insulated from one another and emanating from a common point proximate to the remote or free probing end of said shell and diverging from said common point at an angle of less than 180°; at least two thermoelectrodes of opposite polarity arranged in said shell, the number of said thermoelectrodes of opposite polarity corresponding to the number of thermoelectrodes of said one polarity emanating from said bundle at said common point; a group of working junctions of said thermoelectrodes of opposite polarities spaced along said thermocouple length; a first working junction of said group of junctions provided in the region of said remote or free probing end of said thermocouple at said common point of said bundle of thermoelectrodes; working junctions of said group of working junctions excluding said first working junction being constructed as undetachable edge or butt joints of thermoelectrodes of different polarities.

10. A thermocouple as defined in claim 9, wherein the thermocouple is made as a flexible multicore cable having a shell diameter-to-length ratio of at least 1:50.

* * * * *

UNITED STATES PATENT OFFICE
CERTIFICATE OF CORRECTION

PATENT NO. : 4,075,036
DATED : February 21, 1978
INVENTOR(S) : Boris Vasilievich Lysikov, et al It is certified that error appears in the above-identified patent and that said Letters Patent are hereby corrected as shown below:

In claim 7, line 2, change "thermocouples" to --thermoelectrodes--.

Signed and Sealed this

Twenty-seventh Day of February 1979

[SEAL]

Attest:

RUTH C. MASON
Attesting Officer

DONALD W. BANNER
Commissioner of Patents and Trademarks